UNITED STATES PATENT OFFICE.

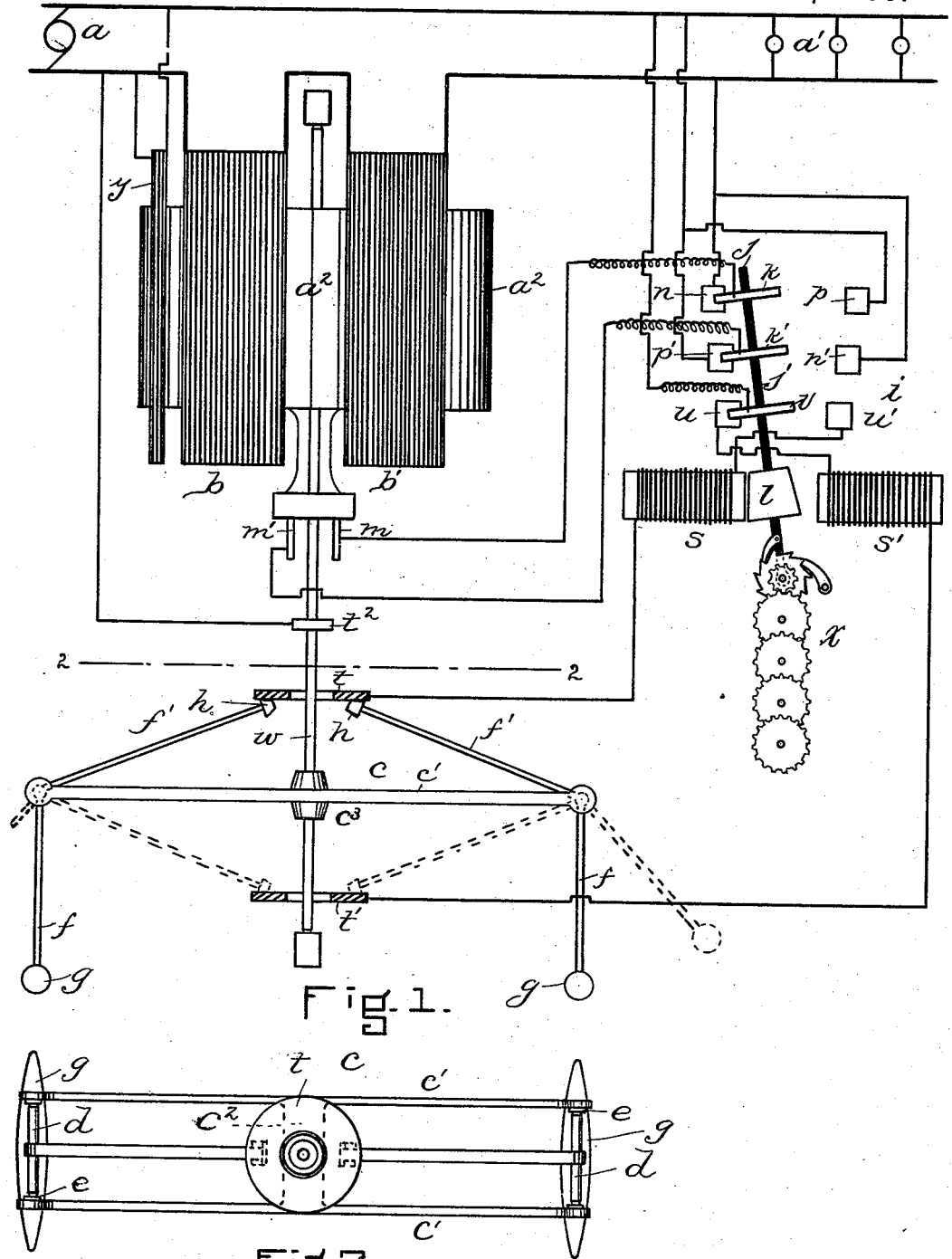

RALPH O. HOOD, OF DANVERS, MASSACHUSETTS.

ELECTRIC METER.

SPECIFICATION forming part of Letters Patent No. 548,755, dated October 29, 1895.

Application filed March 9, 1895. Serial No. 541,187. (No model.)

*To all whom it may concern:*

Be it known that I, RALPH O. HOOD, of Danvers, in the county of Essex and State of Massachusetts, have invented certain new and useful Improvements in Electric Meters, of which the following is a specification.

My invention relates to electric meters for use on either continuous or alternating-current circuits and is based upon the principle that a force gives a definite velocity to a constant mass in a period of time inversely proportional to the energy or strength of the force. Consequently if a force be produced which varies with the consumption of the current or the electricity in use and this force is made to act upon a mass in such manner as to give it a predetermined velocity and then the movement of the mass is automatically stopped and started again immediately and the operation is successively repeated, it is apparent that the number of repetitions in a given time will vary with the electricity in use. Hence by recording the successive movements of the mass—i. e., the number of repetitions of stopping and starting—an indication of the amount of electricity consumed will be given.

My invention therefore consists of an electric meter in which the above principle is applied, it comprising in its construction a movable structure—i. e., the mass—acted upon by the dynamic action of a coil placed in the circuit to be measured, a device for automatically and intermittingly retarding the movement of the structure successively and continuously, and means for recording each retardation of the structure.

I hereinafter describe one of the many mechanisms in which this principle may be embodied; but it will be understood that I do not limit myself thereto, as many and various changes may be made without departing from the spirit and scope of my invention.

Reference is to be had to the annexed drawings, and to the letters marked thereon, forming a part of this specification, the same letters designating the same parts or features, as the case may be, wherever they occur.

Of the drawings, Figure 1 is a diagrammatic view showing the circuits and the various parts of my invention. Fig. 2 is a plan view, partly in section, on the line 2 2 of Fig. 1.

In the drawings I have shown the main-line circuit to be measured as having generating devices (indicated by $a$) and consuming devices, (indicated by $a'$.) In the circuit I place an electric motor with a rotatable armature $a^2$ and two field-coils $b$ $b'$, the latter being connected in series with the main circuit and the former being connected in a shunt-circuit. There being no iron used in the coils of the motor and the speed thereof being very low, the force exerted between the fixed coils and the movable armature-coils (which have a very high resistance) varies with the energy consumed in the work-circuit according to well-known principles.

The armature-shaft is suitably journaled and is extended at $w$. It has rigidly mounted upon it a structure or frame $c$, consisting of two parallel side bars $c'$ $c'$, supported upon or formed integrally with a central cross-piece $c^2$, having a hub $c^3$, through which the armature-shaft passes. At the ends the side bars $c'$ are provided with inwardly-projecting bearings $e$, in which are journaled shafts $d$ $d$. Rigid with these shafts are arms $f$ $f'$, each shaft $d$ and its arms $f f'$ being made integral, if desired. On the end of each arm $f$ is a weight $g$, which will normally hold it in a vertical position when the frame $c$ is stationary. The arm $f$ is provided at its inner free end with a contact-point $h$. It will be seen that when the frame is rotated with a sufficient degree of speed by the armature-shaft the weights will be thrown outward by centrifugal force and the arms will assume the positions shown in dotted lines.

At $t$ is a stationary metallic ring, with which the point $h$ engages and forms a contact when the frame is at rest, and at $t'$ is a similar ring which the contact $h$ will engage when the weights are thrown outward by centrifugal action, due to the rotation of the frame. The rings $t$ and $t'$ are stationarily mounted upon any suitable means (not shown) and have central apertures large enough to allow of the armature-shaft being passed therethrough without danger of touching them.

The main circuit is connected to the armature-shaft $w$ by a brush $t^2$. Thus it will be seen that if the brushes $m$ $m'$ of the commutator be connected with a current-reversing switch mechanism, under the control of a magnet energized by the contact of point $h$ with the rings $t$ and $t'$, the current in the coils of the armature can be reversed and a drag be thereby put on the armature, so that its rotating will be automatically stopped—i. e., retarded—or accelerated, according as contact-point $h$ is in contact with ring $t$ or ring $t'$.

At $i$, I have shown one form of reversing mechanism which is suitable for this purpose. The brushes $m$ $m'$ are respectively connected with contact-strips $k$ $k'$, which are mounted on a pivoted insulated arm or lever $j$. On one side of the strips are contact-plates $p$ and $n'$ and on the other side are contact-plates $n$ and $p'$, with which the contact-strips alternately engage when the pivoted arm swings back and forth, such alternate contacting of the strips with the plates causing a reversing of the current through the armature-coils, as will be clearly seen.

In order that the lever $j$ may be moved back and forward, I secure to it an armature $l$, which is placed between two magnets $s$ $s'$, the coil of magnet $s$ being connected with the metallic ring $t$ and that of magnet $s'$ being connected with ring $t'$. Then in order to immediately break the contact between the rings and the point $h$ when they engage I connect the coil of magnet $s$ with a contact-plate $u'$ on one side of lever $j$ and connect the coil of magnet $s'$ with a contact-plate $u$ on the other side of the said lever. Then on the lever I place a metallic contact-strip $v$, which is connected to the work-circuit.

The lever $j$ of the switching mechanism actuates the recording mechanism $x$ by means of a ratchet and pawl, the said actuating mechanism being any which is suitable for the purpose.

At $y$ is a starting-coil for compensating and balancing the effect of friction of the bearings of the motor and is connected in shunt to the main circuit.

The operation of the device is simple, it being as follows: Suppose the armature to be in a state of rest with no current flowing through the coils $b$ and $b'$. Immediately upon the establishment of an electric flow through said coils the force exerted by them dynamically upon the armature $a^2$ (which at this time is connected in shunt to the main circuit by means of the reversing-switch, which is in the position shown in full lines) will accelerate the motor and the mass of the structure or frame to which it is attached from a state of rest to a velocity sufficient to throw the weights $g$ and arms $f$ $f'$ to the position shown in dotted lines. The point $h$ will make contact with ring $t'$, putting magnet $s'$ into the circuit. The magnet attracts armature $l$ and reverses the current in armature $a^2$ by drawing the lever $j$ until contact-strips $k$ $k'$ are in electrical connection with plates $p$ $n'$. This action of reversing the armature-current will tend to bring the frame $c$ to a state of rest, which will result in the weight $g$ assuming its normal position, thereby causing contact-point $h$ to make contact with ring $t$. This will throw magnet $s$ into the shunt-circuit and the lever will be forced into the position shown in full lines, thereby reversing the current in the armature-coils, as will be understood. Each movement of the switch mechanism is recorded by the recording mechanism. These operations just above described will be repeated with a frequency dependent upon the electricity consumed by the consumption devices $a'$ on the main or work circuit.

The contacts $u$, $v$, and $u'$ are for the purpose of breaking the currents in the magnets $s$ and $s'$ after they have acted as aforesaid, thereby eliminating any trouble that might be caused by sparking at the contacts $t$, $h$, and $t'$.

It will be understood that in practice when in operation the movable structure or frame need not come to an absolute state of rest in order to make a good contact between point $h$ and ring $t$, as it is necessary to have but a slight pressure of contact-point $h$, and hence contact will be made before the frame has actually stopped. This will induce no practical errors in the instrument, as it will tend to affect it on all loads alike.

Having thus explained the nature of the invention and described a way of constructing and using the same, though without attempting to set forth all of the forms in which it may be made or all of the modes of its use, it is declared that what is claimed is—

1. In an electric meter, the combination of a coil in the circuit to be measured, a movable structure acted upon by the dynamic action of said coil to move it, a device for intermittingly retarding the speed of the structure when it has reached a definite velocity, and means for recording each retardation of the structure.

2. In an electric meter, the combination of an electric motor placed in the circuit to be measured, means for intermittingly retarding the speed of the movable part of the motor when it has reached a definite high velocity, until it moves with a definite low velocity, and means for recording each successive retardation.

3. In an electric meter, the combination of an electric motor placed in the circuit to be measured, a device for stopping the motor after it has reached a definite speed, a device for accelerating the speed of the motor after it has been stopped, and means for recording each operation of said devices.

4. In an electric meter, the combination of an electric motor placed in the circuit, a device for intermittingly reversing the current in one part of the motor after the motor has reached a definite high speed, and for intermittingly reversing said current to its original direction after the motor has reached a definite low speed, and means of recording the operations of said device.

5. In an electric meter, the combination of a motor having its fixed coil or coils connected in series with the main circuit and its movable coils in a shunt circuit, a device for intermittingly reversing the direction of the circuit in the movable coils after the movable coils have reached a definite high speed, thereby stopping the motor, a device for intermittingly reversing the current in said movable coils when they have stopped or reached a definite low speed, and means for recording the number of reversals of the current.

6. In an electric meter, the combination of a motor having its fixed coils in series with the main circuit and its movable coils in a shunt circuit to the main circuit, a reversing switch for the movable coils, and a device actuated by said motor for intermittingly operating said switch at predetermined times.

7. In an electric meter, the combination of a motor having its fixed coils in the main circuit, and its movable coils in a shunt circuit, a switch mechanism for alternately reversing the current in said movable coils, and a centrifugal device under the control of the movable coils for operating said switch mechanism, substantially as set forth.

8. In an electric meter, the combination of a motor, having its fixed coils in series with the main circuit, and its movable coils in a shunt circuit, a switch mechanism for alternately and intermittingly reversing the current in said movable coils, a magnetic device for operating said switch mechanism and a centrifugal device under the control of the movable coils for intermittingly energizing said magnetic device.

9. In an electric meter, a motor having its fixed coils in the main circuit, and its movable coils in a shunt circuit, a switch for intermittingly and alternately reversing the current through said movable coils, two magnets for operating said switch in opposite directions, a rotatory frame mechanically connected with said movable coils whereby it is rotated, two contacts in circuit with said magnets, and a weighted arm on said frame in said circuit adapted to contact with said contacts alternately as the speed of said movable coils is accelerated or retarded by the reversing of the currents, whereby said magnets are alternately energized for reversing said switch.

10. In an electric meter, the combination with a motor having its fixed coils in series with the main circuit and its movable coils in a shunt to the main circuit and an additional fixed starting coil in shunt to the said main circuit, of a device for alternately retarding said movable coils when they have reached a definite high velocity and accelerating them when they have reached a definite low velocity, and a mechanism for recording the retardations and accelerations of said movable coils.

11. An electric meter comprising in its construction, a motor, an automatic reversing switch for the armature coils and operated by said motor, and a device for recording the movements of said switch.

12. An electric meter comprising in its construction a motor, a reversing switch in the circuit through the armature of said motor, a magnet for operating said switch, a centrifugal device operated by said motor and in a circuit with said magnet, and means on said switch for breaking said circuit in said magnet as soon as said magnet is energized.

In testimony whereof I have signed my name to this specification, in the presence of two subscribing witnesses, this 6th day of March, A. D. 1895.

RALPH O. HOOD.

Witnesses:
ARTHUR W. CROSSLEY,
MARCUS B. MAY.